(12) United States Patent
Hill et al.

(10) Patent No.: US 10,137,489 B2
(45) Date of Patent: Nov. 27, 2018

(54) ROTARY STAMPER

(71) Applicants: Donald R. Hill, Glen Ellyn, IL (US);
James Gafkowski, Park Ridge, IL (US)

(72) Inventors: Donald R. Hill, Glen Ellyn, IL (US);
James Gafkowski, Park Ridge, IL (US)

(73) Assignee: FORMTEK, INC., Westfield, MA (US)

( * ) Notice: Subject to any disclaimer, the term of this patent is extended or adjusted under 35 U.S.C. 154(b) by 83 days.

(21) Appl. No.: 14/265,984

(22) Filed: Apr. 30, 2014

(65) Prior Publication Data

US 2014/0318204 A1  Oct. 30, 2014

Related U.S. Application Data

(62) Division of application No. 12/539,953, filed on Aug. 12, 2009, now Pat. No. 8,783,082.

(51) Int. Cl.
*B21D 22/08* (2006.01)
*B21D 28/36* (2006.01)
*B21D 43/02* (2006.01)
*B23D 25/08* (2006.01)

(52) U.S. Cl.
CPC ............ *B21D 22/08* (2013.01); *B21D 28/36* (2013.01); *B21D 43/028* (2013.01); *B23D 25/08* (2013.01); *Y10T 83/0515* (2015.04); *Y10T 83/465* (2015.04)

(58) Field of Classification Search
CPC ...... B21D 22/08; B21D 43/028; B21D 31/02; B21D 45/00; B21D 28/36; B21B 13/18; B21B 31/02; B21B 31/16; B21B 31/20; B21B 31/22–31/32; B23D 25/02; B23D 25/04; B23D 25/06; B23D 25/08; B23D 25/10; B23D 25/12; Y10T 83/0515; Y10T 83/0519; B30B 15/041; B30B 15/045; B30B 1/06; B30B 1/14
USPC ......... 72/184, 190, 191, 192, 196, 199, 237; 83/343–345
See application file for complete search history.

(56) References Cited

U.S. PATENT DOCUMENTS

| 3,496,824 | A | * | 2/1970 | Barkley | B21D 37/10 83/637 |
| 4,165,665 | A | * | 8/1979 | Shimizu | B23D 25/04 83/287 |
| 4,299,151 | A | * | 11/1981 | Burton | B26D 1/605 83/300 |

(Continued)

*Primary Examiner* — Teresa M Ekiert
*Assistant Examiner* — Gregory Swiatocha
(74) *Attorney, Agent, or Firm* — Grogan, Tuccillo & Vanderleeden, LLP

(57) ABSTRACT

A rotary stamper includes an upper die plate assembly, a lower die plate assembly, and a support frame having a drive assembly that moves the upper die plate horizontally and vertically along a generally circular pathway while moving the lower die plate along a linear horizontal pathway. The upper die plate is vertically slidably connected to the lower die plate by way of one or more vertical rods that extend from the lower die plate assembly up through the upper die plate. In operation, the lower die plate matches the horizontal movements of the upper die plate as the latter is moved along its circular pathway. Concurrently, the upper die plate moves towards and away from the lower die plate. This maintains a substantially constant alignment between the die plates for carrying out a periodic machining operation on a moving web of material passing there between.

4 Claims, 5 Drawing Sheets

(56) References Cited

U.S. PATENT DOCUMENTS

| | | | |
|---|---|---|---|
| 7,363,791 B2* | 4/2008 | Bodnar | B21D 28/36 72/190 |
| 2002/0095968 A1* | 7/2002 | Matsunaga | B21D 22/02 72/350 |
| 2005/0155403 A1* | 7/2005 | Tidemann et al. | 72/347 |
| 2008/0105098 A1* | 5/2008 | Barnes | B21D 28/26 83/345 |

* cited by examiner

ROTARY STAMPER

CROSS REFERENCE TO RELATED APPLICATION

This application is a divisional of U.S. patent application Ser. No. 12/539,953, filed on Aug. 12, 2009, entitled "ROTARY STAMPER", herein incorporated by reference in its entirety.

FIELD OF THE INVENTION

The present invention relates to machine tools and, more particularly, to devices for performing machining operations on a moving web of metal or similar material.

BACKGROUND OF THE INVENTION

For maximizing manufacturing throughput on an industrial scale, metal sheets are oftentimes processed as a moving web of material. Thus, an elongate sheet of metal is driven past a series of manufacturing stations, where various machining or other operations are carried out on the moving web. One such operation involves applying a die set to the metal web, for deforming the web in a desired manner. For example, the die set may include a punch and a die, which, when pressed together with the web in between, form a hole in the web.

For carrying out punching operations on a moving web of metal, one or more punches are typically attached to the surface of a rotating drum or wheel, which is deployed on one side of the metal web. The other side of the metal web is supported in a complementary manner, e.g., a die or other support surface. The drum is carefully speed matched to the speed of the web. As the drum rotates, the punches on the surface of the drum are rotated into punching contact with the moving web, forming a hole or other desired feature. However, because the drum moves in a rotating manner whereas the web is moving linearly, there is a non-ideal interaction between the punch and web. In particular, not only does the punch move in a vertical direction with respect to the web, as in an ideal punching operation, but there is a concomitant degree of relative lateral motion as well. This "sweeping" or "wiping" motion of the punch causes the edges of the punch to laterally interact with the web, which can damage the punch or at least severely limit the times between required changeover or retooling.

SUMMARY OF THE INVENTION

It is an object of the present invention to provide a rotary stamper that mimics, in an ongoing and continuous basis, an ideal punching operation (or other die-based machining operation) on a moving web of metal or other material.

To achieve this and other objects, an embodiment of the present invention relates to a rotary stamper having a support frame, an upper die plate assembly, and a lower die plate. (In this context, "rotary stamper" refers to a machine tool using a die set for carrying out a periodic or repeating machining operation on a web of material, including, but not limited to, punching operations.) The support frame includes a drive assembly, which rotates or drives the upper die plate assembly both horizontally and vertically along a generally circular pathway. The lower die plate is connected to the support frame for movement in a linear horizontal direction only, that is, the lower die plate is limited to moving horizontally back-and-forth. The upper die plate assembly is slidably connected to the lower die plate, e.g., by way of one or more vertical alignment rods that extend through bushings provided in the lower die plate. Thus, in operation, as the upper die plate assembly is moved horizontally and vertically along its circular pathway, the lower die plate horizontally follows or tracks along with the upper die plate assembly, as the upper die plate concurrently moves towards and away from the lower die plate. This maintains a substantially constant alignment between the lower die plate and the upper die plate assembly for carrying out a periodic machining operation on a moving web of material passing between the upper die plate assembly and the lower die plate. (By "substantially" constant, it is meant constant but for variances originating from manufacturing tolerances.)

In another embodiment, when the upper die plate assembly is driven to move horizontally at a speed that matches the speed of the moving web of material (with the lower die plate following along), that is, the horizontal component of the upper die plate assembly's movement matches the speed of the moving web, there is substantially no relative horizontal movement between the upper die plate assembly, the lower die plate, and the moving web of material, during at least part of the time when the upper die plate assembly is moved vertically towards the lower die plate for carrying out the machining operation on the moving web of material. In this manner, the upper die plate assembly and lower die plate are speed matched to the moving web, while concurrently moving toward one another (relatively speaking), for performing the punching operation or other machining operation. This mimics, or at least substantially approximates, an ideal machining operation on a web of material, where there is no unwanted relative lateral movement between the die plates and web of material.

In another embodiment, the upper die plate assembly includes two parallel, vertically oriented side plates (each carrying a cylindrical bearing), one or more vertical alignment rods attached to the top of each of the side plates, and an upper die plate attached to the top ends of the alignment rods. The upper die plate assembly is slidably connected to the lower die plate. In particular, the alignment rods extend vertically through bushings provided in the lower die plate, for the upper die plate assembly to slide vertically towards and away from the lower die plate. The lower die plate is carried on opposed linear bearing and rail assemblies attached to the support frame, and is positioned between the upper die plate and the side plates of the upper die plate assembly. The drive assembly includes a crankshaft having two aligned, offset pinions. Each of the pinions drives a gear train including upper and lower gears. The upper gears are connected by the upper die plate assembly, and cause the entirety of the upper die plate assembly to move along a generally circular pathway as the crankshaft rotates. The lower gears engage the lower die plate assembly via cam plates. The upper and lower die plate assemblies are slidably connected by vertical alignment rods. The lower die plate assembly is restrained from vertical motion by linear bearing and rail assemblies. The lower die plate assembly reciprocates horizontally, in vertical alignment with the upper die plate assembly. Thus, the upper die plate assembly is maintained at a substantially constant attitude as it moves along its circular pathway, and the speeds of the upper and lower die plate assemblies periodically approach the speed of a metal web passing therebetween.

In another embodiment, for carrying out a machining operation, the rotary stamper includes a die connected to the top surface of the lower die plate, and a work member, complementary to the die, connected to the bottom surface of the upper die plate. For example, the work member may be a punch for generating a hole in the moving web of material. In such a case, the lower die plate may include a drop aperture cooperative with the die and punch for removing waste material.

In another embodiment, the rotary stamper includes two gusset plates, which are attached to the underside of the lower die plate and extend downwards there from. A bottom support or stiffening plate is attached to the lower ends of the gusset plates. The alignment rods of the upper die plate assembly are slidably connected to the bottom stiffening plate, similarly as with the lower die plate. The gusset plates and bottom stiffening plate form a box section in conjunction with the lower die plate, which stiffens the lower die plate and helps to stabilize the moving portions of the rotary stamper.

BRIEF DESCRIPTION OF THE DRAWINGS

The present invention will be better understood from reading the following description of non-limiting embodiments, with reference to the attached drawings, wherein below.

DETAILED DESCRIPTION

Figure 1:
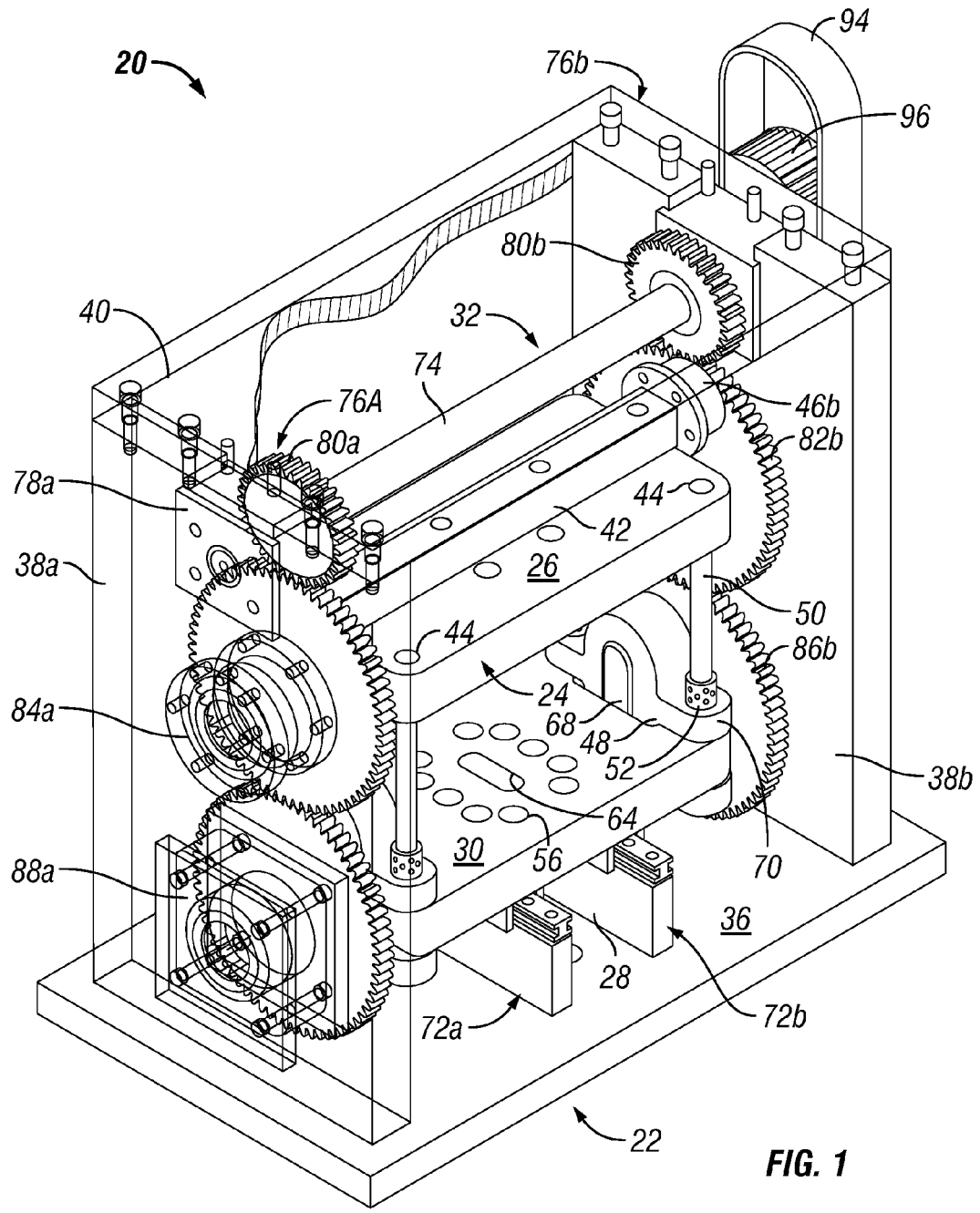
FIG. 1 is a first perspective view of a rotary stamper according to an embodiment of the present invention.

With reference to FIGS. 1-6, a rotary stamper 20 includes a support frame 22, an upper die plate assembly 24 having an upper die plate 26 (also referred to herein as the primary die plate assembly and die plate), a lower die plate assembly 28 having a lower die plate 30 (also referred to herein as the secondary die plate assembly and die plate), and a drive assembly 32, which moves the upper and lower die plate assemblies 24, 28 along upper and lower pathways 34a, 34b relative to the support frame 22. The upper die plate assembly 24 is connected to the drive assembly 32, which drives the upper die plate assembly 24 both horizontally and vertically along a generally circular pathway 34a. The lower die plate assembly 28 is connected to the drive assembly 32 and to the support frame 22 for movement in a linear horizontal direction only, that is, the lower die plate is limited to back-and-forth horizontal movement, as indicated in the drawings by arrow "34b". The upper die plate assembly 24 is vertically slidably connected to the lower die plate assembly 28. Thus, in operation, as the upper die plate assembly 24 is moved horizontally and vertically along its circular pathway 34a, the lower die plate assembly 28 horizontally follows (i.e., tracks along with) the upper die plate assembly 24 on the linear pathway 34b, as the upper die plate 26 concurrently moves towards and away from the lower die plate 30. This maintains a substantially constant alignment between the lower die plate 30 and the upper die plate 26 for carrying out a periodic or repeating machining operation on a moving web of material 35 passing between the upper die plate assembly 24 and the lower die plate assembly 28.

When the upper die plate assembly 24 is driven so that the horizontal speed of its movement matches the speed of the moving web of material 35 (with the lower die plate assembly 28 following along), there is substantially no relative horizontal movement between the upper die plate 26, the lower die plate 30, and the moving web of material 35, at least during the time when the upper die plate assembly is moved vertically towards the lower die plate for carrying out the machining operation on the moving web of material 35. In this manner, the upper die plate assembly 24 and lower die plate assembly 28 are speed matched to the moving web 35, while concurrently moving toward one another in a relative sense, for performing a punching operation or other machining operation. The speed-matching of the upper and lower die plates 26, 30 to the web 35 mimics (or at least substantially approximates) an ideal machining operation on a stationary web of material, where there is no unwanted relative lateral movement between the die plates and web of material.

As indicated above, although the present invention is characterized as being a "rotary stamper," this is meant to refer more generally to a machine tool that uses a die set for carrying out a periodic or repeating machining operation on a web of material. One possible machining operation, of course, is a true punching operation, for removing material from the web to form apertures therein. Another possibility is a form-stamping operation, for plastically deforming the web to provide three-dimensional surfaces enclosing cavities. "Rotary" refers generally to the cyclic operation of the machine tool for repeating the machining operation on a moving web of material, and more specifically to the circular motion of the upper die plate assembly 24.

Figure 2:
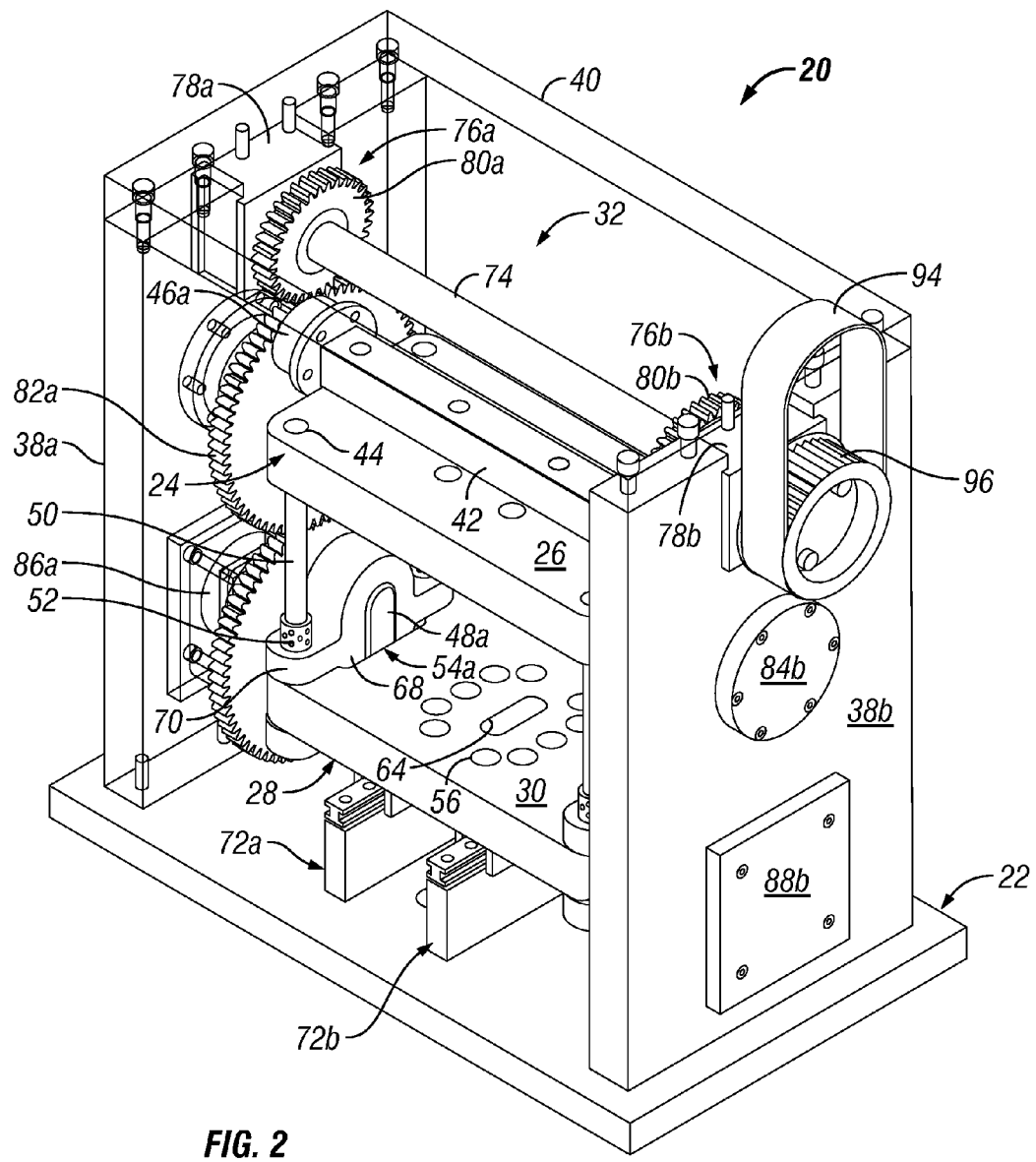
FIG. 2 is a second perspective view of the rotary stamper.
Figure 3:
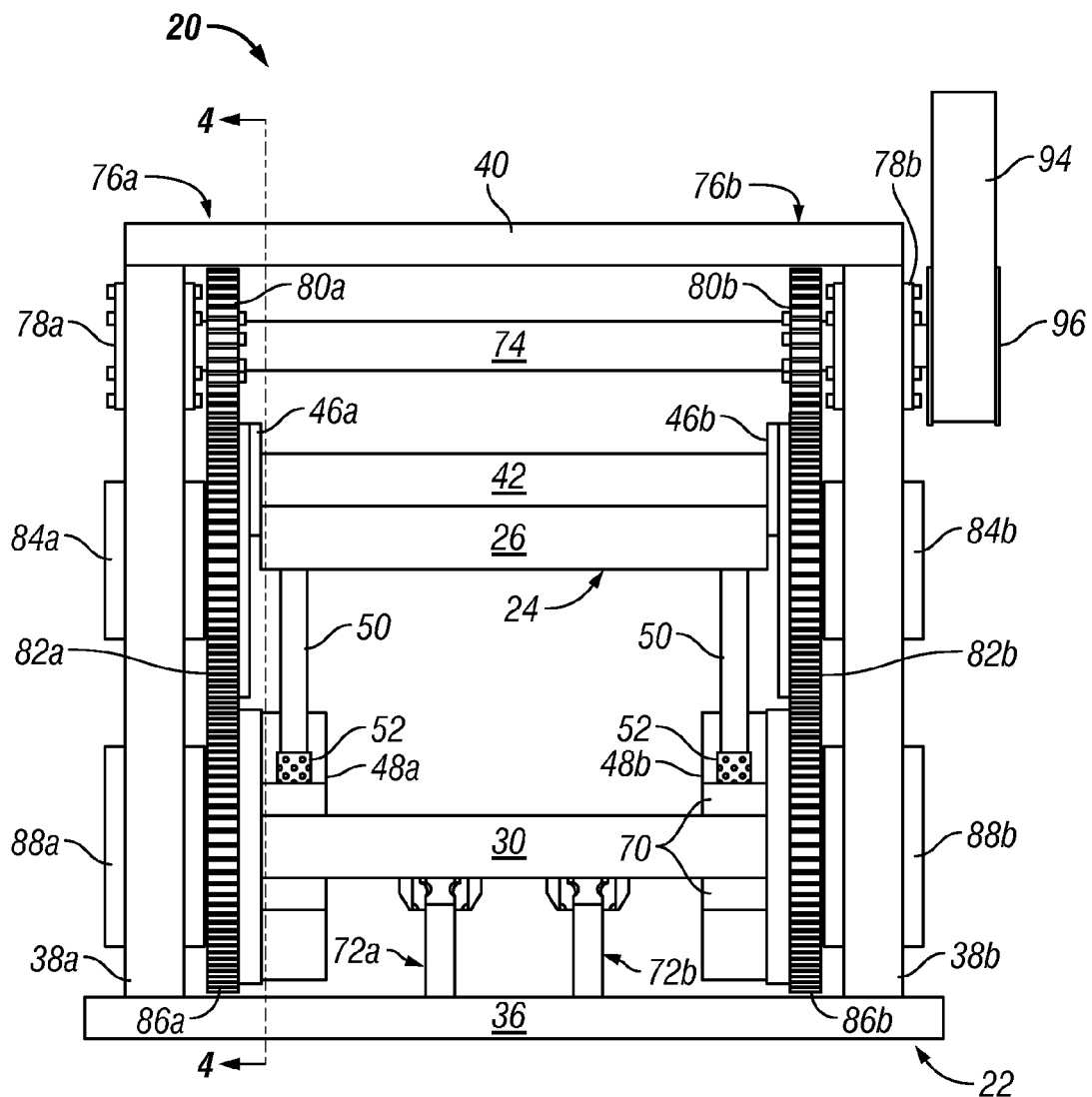
FIG. 3 is a front elevation view of the rotary stamper.
Figure 4:
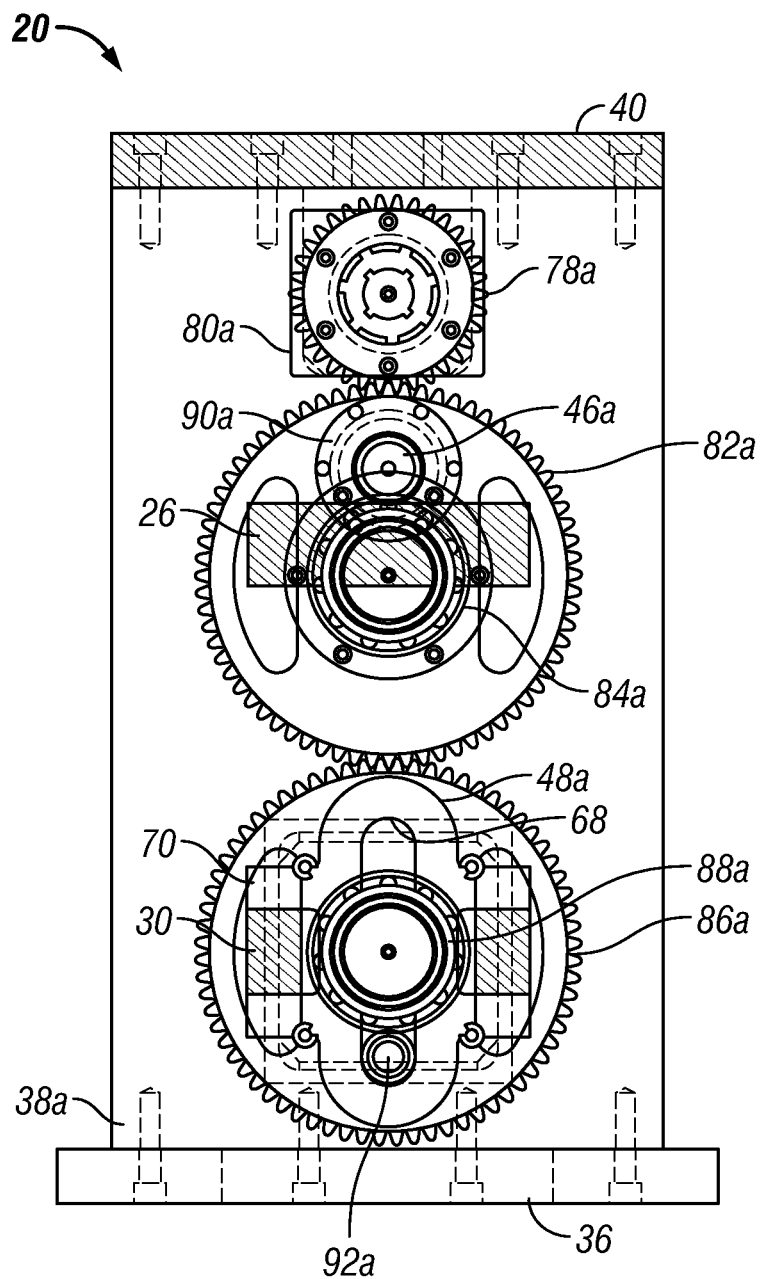
FIG. 4 is a width-wise cross-section view of the rotary stamper, showing in particular a drive gear train of the rotary stamper, taken along line 4-4 in FIG. 3.

With reference to FIGS. 1-6, the various parts of the rotary stamper 20 will now be explained in more detail. The support frame 22, as its name indicates, is a stationary assembly used for supporting and protecting the moving parts of the rotary stamper. The support frame 22, which will typically be stationed on a floor or other base 36, includes left and right support frame plates 38a, 38b. The plates 38a, 38b are generally parallel and generally vertically oriented, and are spaced apart by a distance meant to accommodate the lower die plate assembly 28 and upper die plate assembly 24. The left and right support frame plates 38a, 38b function to support the upper die plate assembly 24, the lower die plate assembly 28, and the drive assembly 32. The support frame 22 also includes a cover plate 40, attached to the left and right plates 38a, 38b, which protects internal/moving components, and which acts as an additional stiffener or support member for the support frame. For example, as shown in FIG. 2, the plates 36, 38a, 38b, 40 together form a box-like structure, which provides a greater level of support than if side plates 38a, 38b were used alone. (Note that the cover plate 40 is shown partly cut away in FIG. 1.)

The plates 38a, 38b, 40, like most of the plate components of the rotary stamper 20 described herein, are generally planar, and are made from a very heavy gauge (e.g., 0.5"-2" thick) sheet steel or other strong and sturdy metal. These heavy support plates facilitate use of the rotary stamper 20 for performing machining operations on metal webs. If the stamper 20 is meant to be used for machining operations on light gauge materials such as very thin, malleable, or soft metals, or on certain plastics, then it may be possible for the punch plates and other components to be lighter duty in nature.

The upper die plate assembly 24 includes the upper die plate 26 and a cam bar 42 fastened widthwise across the upper side of the upper die plate 26. The upper die plate 26 has holes 44 formed therethrough for connection with the lower die plate assembly 24, as further discussed below. The cam bar has plugs 46a, 46b formed at its left and right ends for engagement with the drive assembly 32, as further discussed below.

The lower die plate assembly 28 includes the lower die plate 30. The lower die plate assembly 28 also includes two parallel, vertically oriented cam plates 48a, 48b disposed at left and right ends of the lower die plate 30, two vertical alignment rods 50 attached to each of the cam plates, and buffers 52 attached to each of the alignment rods. The lower die plate 30 is generally H-shaped, with the legs of the "H" shape being defined by two side clearance cutouts 54a, 54b. The lower die plate 30 also includes fixtures 56 for attaching a die portion of a die set (which includes the die and a punch or other work member for attachment to the lower surface of the upper die plate 26; not shown) to the top surface of the lower die plate 30. If the machining operation carried out by the rotary stamper 20 involves removal of material from the web of material 35, then the lower die plate assembly 30 will also typically include a drop aperture 64 for facilitating passage of waste material from the rotary stamper. The left and right cam plates 48a, 48b are generally I-shaped, and have slots 68 formed through the vertical part of the "I" shape for engagement with the drive assembly 32, as further discussed below. Each cam plate 48a, 48b fits into one of the side clearance cutouts 54a, 54b of the lower die plate 30. Each cam plate 48a, 48b has legs 70 that protrude forward and rearward above and below the lower die plate 30.

The vertical alignment rods 50 of the lower die plate assembly 28 extend through the holes 44 of the upper die plate 26, and are vertically slidable with respect thereto. For this purpose, the upper die plate 26 can be provided with bushings (not shown) that accommodate the alignment rods 50 in a sliding, low-friction manner. The vertical alignment rods 50 enable the upper die plate assembly 24 to move vertically towards and away from the lower die plate assembly 28, while remaining aligned therewith at a substantially constant attitude.

The lower die plate assembly 28 is disposed between the left and right support frame plates 38a, 38b, and is connected thereto for reciprocal motion along a linear horizontal pathway 34b that corresponds to the direction of travel of the moving web of material 35. For this purpose, first and second linear bearing and rail assemblies 72a, 72b are mounted on the base plate 36 between and parallel to the left and right support frame plates 38a, 38b. The linear bearing and rail assemblies 72a, 72b allow the lower die plate assembly 28 to move back-and-forth along the pathway 34b, and prevent the lower die plate assembly 28 from moving otherwise. In particular, the lower die plate assembly 28 is vertically fixed, meaning that it is prevented from moving vertically up or down, or from twisting or angling out of the horizontal. (In the context of the lower die plate, the designation "horizontal" or "lateral" refers to a plane defined by the lower die plate, or a plane parallel to that plane, not necessarily to a plane that lies horizontal to the ground. "Vertical" refers to a direction perpendicular to the plane defined by the lower die plate.)

The drive assembly 32 is carried on the support frame 22, and includes an axle or crankshaft 74 and left and right gear trains 76a, 76b. The crankshaft 74, lying parallel to the base 36, extends between and is supported by bearings 78a, 78b that are housed in the left and right support frame plates 38a, 38b, respectively. As such, the crankshaft 74 is free to rotate about its fixed longitudinal axis "L" (see FIG. 6). The gear trains 76a, 76b include pinions 80a, 80b that are non-movably connected to the crankshaft 74 to lie proximate to the left and right support frame plates 38a, 38b, respectively. The pinions 80a, 80b engage upper gears 82a, 82b that are rotatably mounted in upper support bearings 84a, 84b housed in the side plates 38a, 38b, respectively. The upper gears 82a, 82b engage lower gears 86a, 86b that are rotatably mounted in lower support bearings 88a, 88b housed in the side plates 38a, 38b, respectively. The upper gears also engage the upper die plate assembly 24 by way of holes 90a, 90b formed through the upper gears for receiving the plugs 46a, 46b of the cam bar 42. The lower gears 86a, 86b engage the lower die plate assembly 28 by way of pegs 92a, 92b projecting from the inward faces of the lower gears. The pegs 92a, 92b are received in the slots 68 formed through the left and right cam plates 48a, 48b.

A standard motor unit (not shown) may be used to drive the crankshaft 72 by way of a belt 94, which engages a drive wheel 96 rigidly mounted to the crankshaft 72.

Operation of the rotary stamper is shown schematically in FIGS. 5A-5D. Generally speaking, the rotary stamper 20 utilizes the rotary motions of the upper and lower gears 82a, 82b, 86a, 86b to produce both a linear horizontal motion of the upper and lower die plates 26, 30 and a vertical motion of the upper die plate 26 towards and away from the lower die plate 30. As the upper die plate assembly 24 moves along the circular pathway 34a, it moves both horizontally and vertically. For example, from a starting point in FIG. 5A, with the crankshaft 74 rotating counterclockwise in this instance, the upper die plate assembly 24 moves both horizontally to the left and vertically downwards to an intermediate position shown in FIG. 5B. With continued rotation of the crankshaft, the upper die plate assembly 24 continues moving vertically downwards but now horizontally to the right, to arrive at the position shown in FIG. 5C. Further rotation causes the upper die plate assembly 24 to move horizontally right and upwards, to FIG. 5D, and then upwards and horizontally left to arrive back at the starting position in FIG. 5A.

Meanwhile, the pegs 92a, 92b of the lower gears 86a, 86b engage the slots 68 of the cam plates 48a, 48b to drive the lower die plate assembly 28 horizontally back and forth along the linear bearing and rail assemblies 72a, 72b in vertical alignment with the upper die plate assembly 24. At the same time, because the upper die plate assembly is slidably connected to the lower die plate assembly 28 (by way of the rods 74), a substantially constant alignment is maintained between the upper and lower die plates 26, 30 as the upper die plate 26 moves vertically, e.g., the upper die plate 26 is maintained at a substantially constant attitude with respect to the lower die plate 30.

Figure 5A:
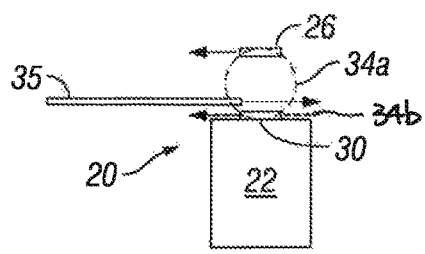
FIGS. 5A-5H are schematic views illustrating the drive assembly in operation.
Figure 5B:
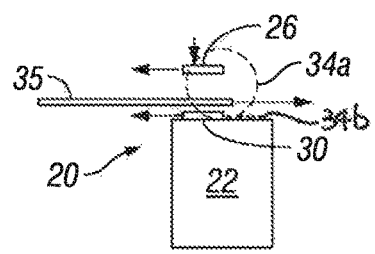
Figure 5C:
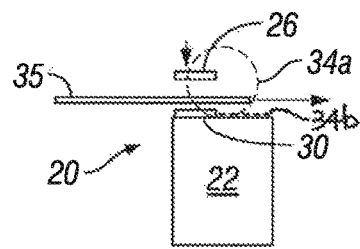

When the upper die plate 26 is fully raised, as shown in FIG. 5A, both die plates 26, 30 are at the center of horizontal travel. In this position, the spacing between the die plates 26, 30 is at a maximum. As the crankshaft 74 rotates, the upper die plate 26 lowers as both die plates 26, 30 move horizontally against the direction of travel of the moving web of material 35 (e.g., from the position shown in FIG. 5A to the position in FIG. 5B). The upper die plate is at half stroke when both plates 26, 30 have moved the maximum distance horizontally (FIG. 5B), and the upper die plate 26 lies fully lowered, at its closest position to the lower die plate 30, when both plates return, in the direction of travel of the moving web 35, to the center of horizontal travel (FIG. 5C).

One rotation of the crankshaft produces one cycle of the upper and lower die plates 26 and 30.

Figure 5D:
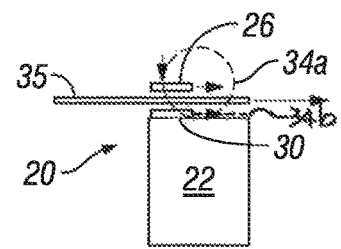
Figure 5E:
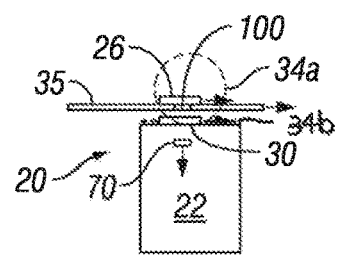
Figure 5F:
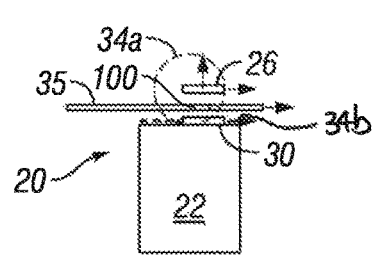
Figure 5G:
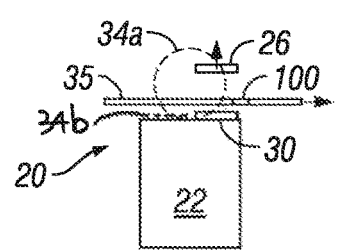
Figure 5H:
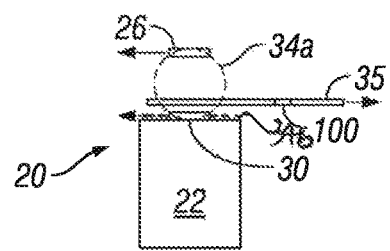
Figure 6:
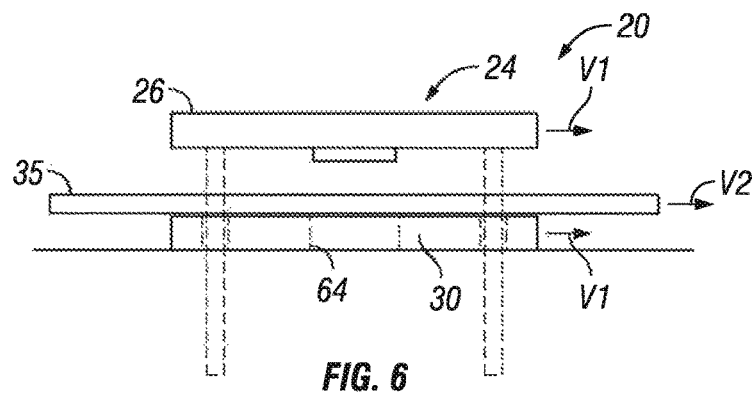
FIG. 6 is a schematic view illustrating a lateral moving alignment between upper and lower die plates and a moving web of material.

In the case where a die set is used in the rotary stamper 20, machining operations are carried out by forcing the work member portion of the die set against (or towards) the die portion of the die set, with a metal sheet or other material web 35 lying between the two. Thus, in the rotary stamper 20, the machining operation is carried out when the upper die plate 26 (which carries the punch or other work member) transitions from its initial half stroke (FIG. 5B) to its fully lowered position (FIG. 5C), with the lower die plate 30 following along horizontally. The remaining segments of movement constitute the upper die plate 26 disengaging from the lower die plate 30 (FIG. 5C to FIG. 5D) and transitioning back for the next subsequent machining operation (FIG. 5D to FIG. 5A to FIG. 5B).

The primary purpose of the rotary stamper 20 is to perform punching or other machining operations on a moving web of metal 35 or other material. For doing so, the upper and lower die plates 26, 30, which are synchronized in terms of horizontal position and attitude, are speed matched to the speed of the moving web of material 35. Thus, with reference to FIGS. 5A-5D, as the upper and lower die plates 26, 30 enter the stage of motion where both plates are moving in the same horizontal direction as the moving web of material 35 and the upper die plate 26 moves vertically downwards towards the lower die plate 30 (see the transition from FIG. 5B to FIG. 5C), the horizontal speed "V1" of the two plates 26, 30 is set to match the horizontal speed "V2" of the moving web of material 35: V1=V2. With the two speeds being matched, there is substantially no relative horizontal movement between the upper die plate 26, the lower die plate 30, and the moving web of material 35 as the upper die plate 26 is moved vertically downwards towards the lower die plate 30, for carrying out the machining operation in question on the web of material 35. As noted above, this mimics an ideal punching or other die set-based operation, where the die and web are stationary, and the punch or other work member is moved vertically downwards against the web and die. This method has been found effective for punching holes in sheet steel traveling at speeds up to 350 fpm.

The upper and lower die plates 26, 30 are speed matched to the moving web of material using a standard control mechanism. The horizontal speed of the plates is a direct function of the rotational speed of the crankshaft 74. The control mechanism monitors the speeds of the web 35, and controls the motor to produce a corresponding speed in the upper and lower die plate assemblies 24, 28, based on a simple mathematical calculation, reference to a lookup table, or the like. In this manner, the upper and lower die plates 26, 30 can be continuously speed matched to the moving web through a substantial segment of the crankshaft rotation. For additional precision, the control mechanism also can monitor the speed of the crankshaft 74.

As noted above, the term "substantially" as used herein refers to the element in question exhibiting the stated characteristic, but for variances arising from manufacturing tolerances.

Although the upper and lower die plates 26, 30 have been illustrated as being rectangular or H-shaped, the die plates could be shaped or configured otherwise without departing from the spirit and scope of the invention. While the upper die plate assembly 24 has been shown as including a cam bar having plugs fitted into the upper gears, the upper die plate assembly equally could be driven by pegs projecting from the upper gears. Also, while the upper die plate 26 has been illustrated as having holes formed therethrough for receiving vertical alignment rods, such rods could extend through lugs attached to a cam bar or could have flattened inward surfaces sliding against outward edges of the upper die plate. Although the die plates have been characterized as an "upper" die plate movable along a circular pathway and a "lower" die plate restricted to horizontal movement, these are arbitrary designations. For example, the horizontally limited die plate could be positioned above the die plate that moves vertically with respect thereto.

Since certain changes may be made in the above-described rotary stamper, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A method for rotary stamping of a workpiece, said method comprising the steps of:
   providing a drive assembly to a support frame;
   operatively connecting an upper die plate assembly to said drive assembly for horizontal and vertical movement; and
   operatively connecting a lower die plate to said drive assembly for movement in a linear horizontal direction only;
   defining opposed side clearance cutouts in said lower die plate wherein said lower die plate includes opposed cam plates positioned within said opposed side clearance cutouts, said cam plates having a pair of opposing legs;
   slidably connecting said upper die plate assembly to said lower die plate via opposed alignment rods for maintaining a substantially constant alignment therewith as said upper die plate assembly moves vertically towards and away from said lower die plate, said alignment rods extending through said legs; and
   passing said workpiece between said upper die plate assembly and said lower die plate during operation of said drive assembly;
   wherein said upper die plate assembly has at least a pair of holes permitting said alignment rods to slidably pass through said holes during said vertical movement of said upper die plate assembly;
   wherein said horizontal and vertical movements of said upper die plate are directly driven by said drive assembly.

2. The method for rotary stamping of a workpiece in accordance with claim 1, further comprising the steps of:
   operatively connecting a die to a top surface of said lower die plate; and
   operatively connecting a work member to a bottom surface of said upper die plate, wherein said die and work member are complementary to one another for carrying out a machining operation on said workpiece.

3. The method for rotary stamping of a workpiece in accordance with claim 2, further comprising the steps of:
   forming said work member as a punch; and
   including a drop aperture formed in said lower die plate, said drop aperture cooperating with said die and punch for removing waste material originating from said machining operation.

4. The method for rotary stamping of a workpiece in accordance with claim 1, further comprising the steps of:
   driving said lower die plate and said upper die plate assembly to concurrently move horizontally at a speed that matches a speed of said workpiece such that there is substantially no relative horizontal movement between said upper die plate assembly, said lower die plate, and said workpiece during at least a portion of the time when said upper die plate assembly is moved vertically towards said lower die plate.

\* \* \* \* \*